United States Patent

Regitz

[15] 3,653,034

[45] Mar. 28, 1972

[54] HIGH SPEED DECODE CIRCUIT UTILIZING FIELD EFFECT TRANSISTORS

[72] Inventor: William M. Regitz, Franklin, Mass.

[73] Assignee: Honeywell Inc., Minneapolis, Minn.

[22] Filed: Feb. 12, 1970

[21] Appl. No.: 10,828

[52] U.S. Cl. ....................................... 340/347 DD, 307/205
[51] Int. Cl. ....................................... H03k 17/00, G06f 5/02
[58] Field of Search .....340/347 DD, 147 T, 147 G, 147 MD, 340/147; 235/155; 307/205, 207, 201, 251, 279, 304, 241–244; 328/104, 110

[56] References Cited

UNITED STATES PATENTS

| | | | |
|---|---|---|---|
| 3,356,858 | 12/1967 | Wanlass | 307/205 |
| 3,506,815 | 4/1970 | Stone | 235/155 |
| 3,479,523 | 11/1969 | Pleshko | 307/205 |
| 3,393,325 | 7/1968 | Borror et al. | 307/217 |
| 3,541,353 | 11/1970 | Seelbach et al. | 307/205 X |

*Primary Examiner*—Thomas A. Robinson
*Attorney*—Fred Jacob and Ronald T. Reiling

[57] ABSTRACT

Herein is revealed a high speed decode circuit having low power consumption, which does not require complementary input signals and which employs transistors preferably of the MOS (Metal Oxide Semiconductor) field effect type. The illustrated embodiment is a decode circuit having a binary input and one of 16 outputs. A plurality of subcircuits are included in the decode circuit, each of which subcircuits includes at least one transistor in a series arrangement connected to at least one transistor in a parallel arrangement, the connection therebetween forming one of the outputs. A select signal is generated on one of the outputs of a particular subcircuit when each of its transistors in series arrangement are conductive and when each of its transistors in parallel arrangement are nonconductive.

11 Claims, 14 Drawing Figures

FIG. I
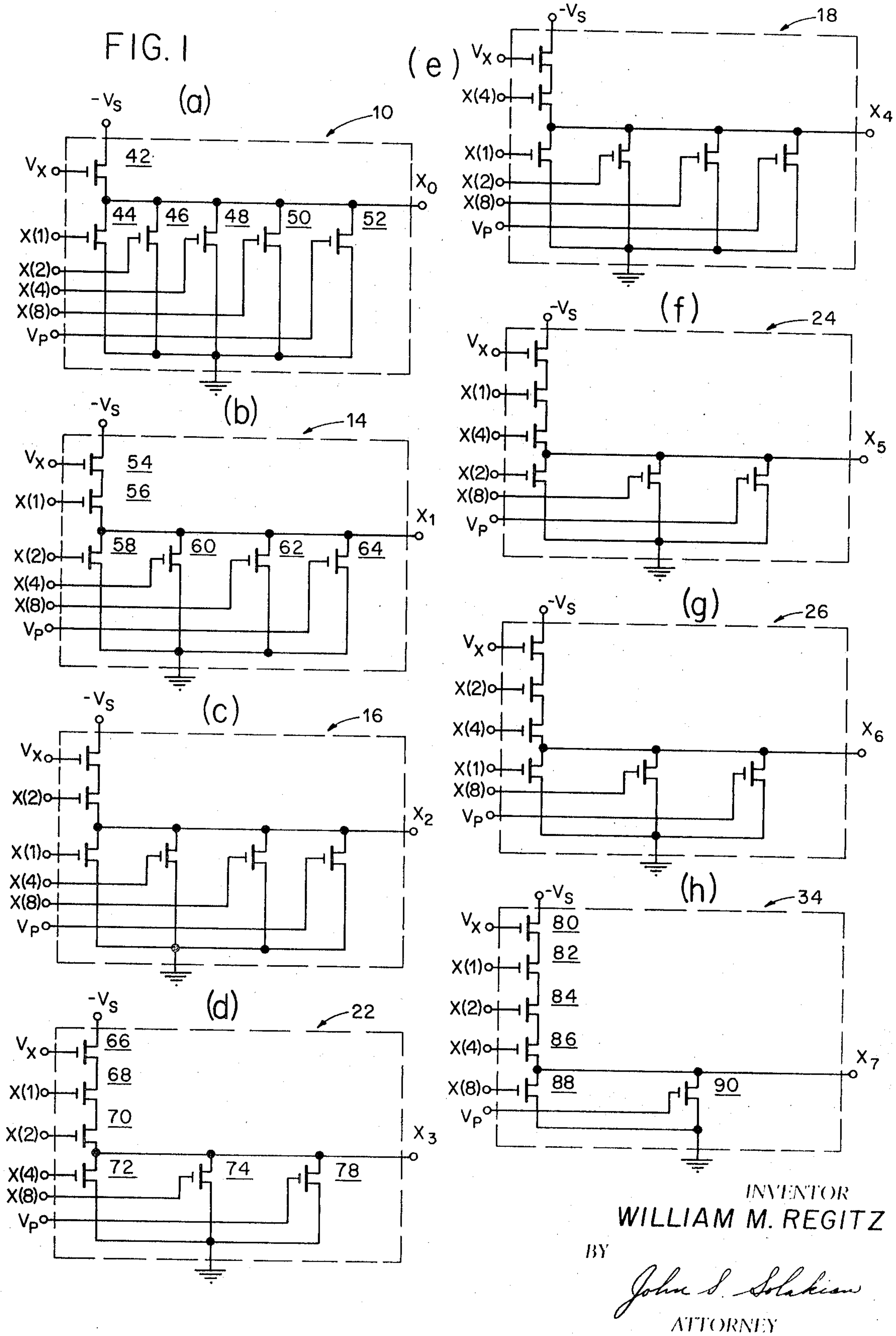
INVENTOR
WILLIAM M. REGITZ
BY
John S. Solakian
ATTORNEY

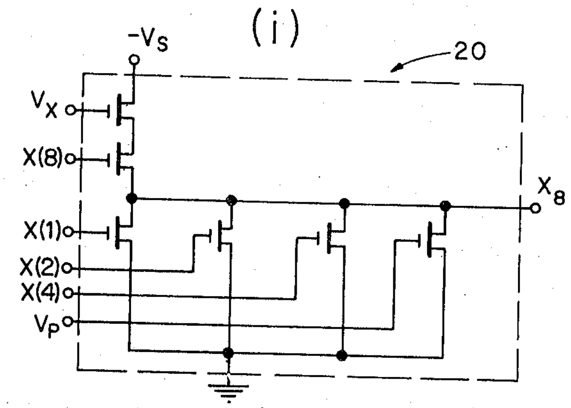
(i)
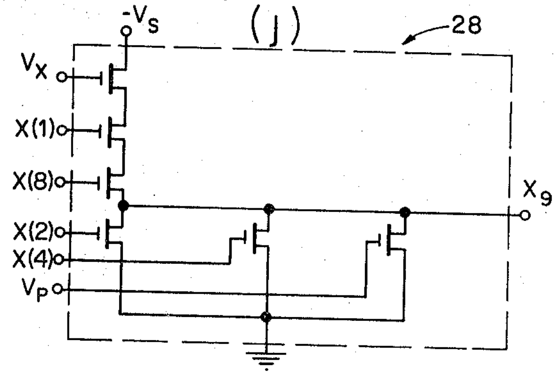
(j)
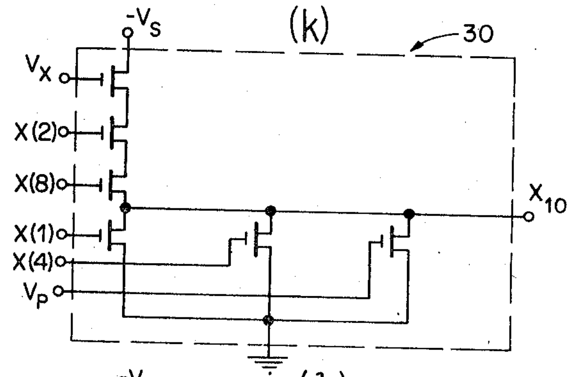
(k)
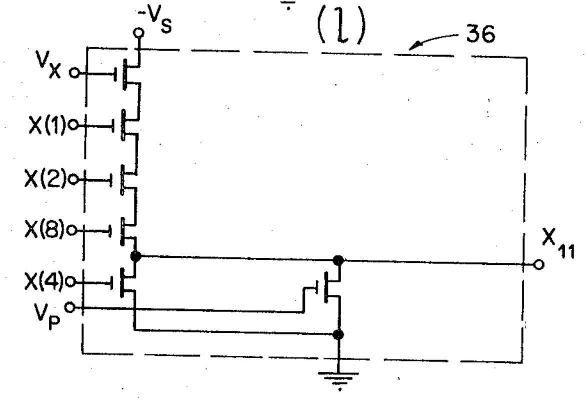
(l)
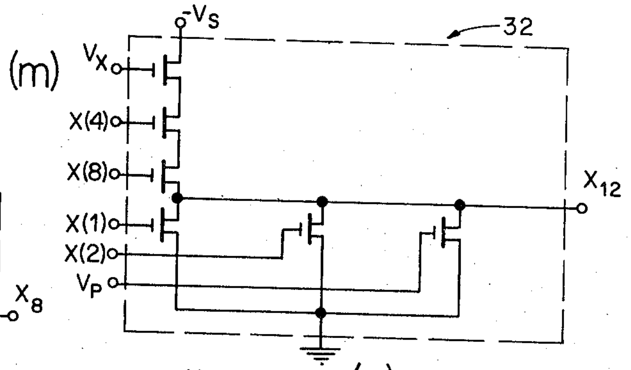
(m)
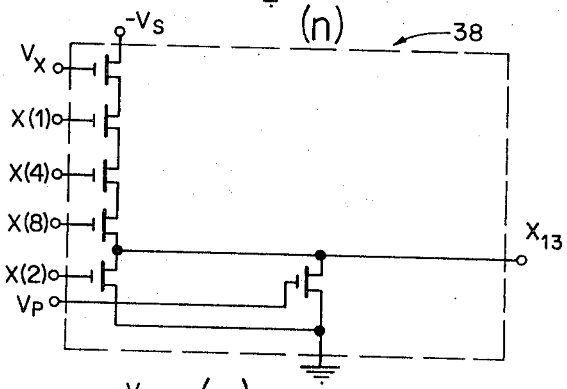
(n)
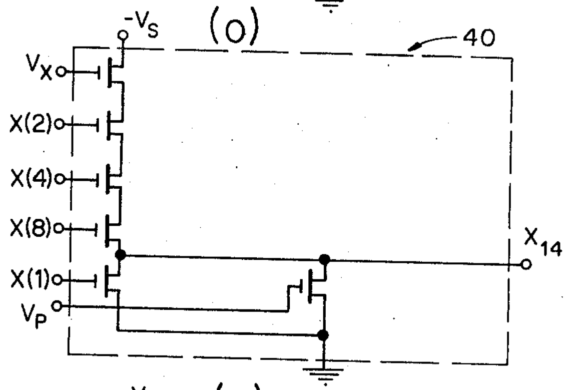
(o)
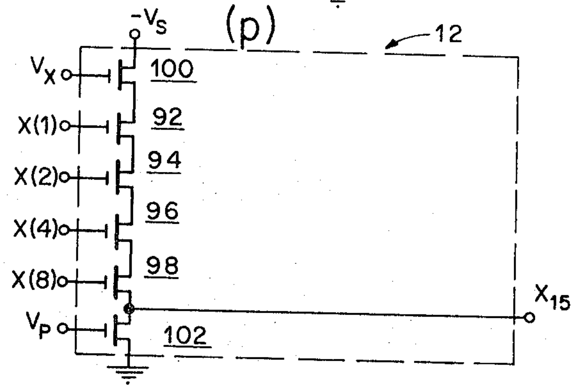
(p)
INVENTOR
WILLIAM M. REGITZ
BY
John S. Solakian
ATTORNEY

HIGH SPEED DECODE CIRCUIT UTILIZING FIELD EFFECT TRANSISTORS

BACKGROUND OF THE INVENTION

A. Field of Invention

The present invention relates generally to decode circuits and more particularly to high-speed decode circuits employing transistors preferably of the field effect type.

B. Description of the Prior Art

The prior art includes a multitude of decoding circuits. These decode circuits generally require input signals including the complement of the input signal. The nature of the design of these decode circuits necessitates an inversion to derive the complement signal. Such inversion delays operation of the circuit in that a decode operation can not begin until the inverting amplifier has completed its operation. The advent of the high-speed computer has made this delay quite critical. Accordingly, elimination of such inversion or the requirement for the complement input signal is desirable.

More particularly, one such prior art decode circuit is illustrated in the book entitled "MOSFET in Circuit Design" by Robert H. Crawford, Texas Instruments Electronics Series, McGraw-Hill Book Company, 1967, at pages 113 and 114. Therein is illustrated a matrix array for a decode circuit which illustrates the requirement for the input signal and its complement. The proper code is built into the matrix by the particular choice of the active intersections of the orthogonal arrangement of the aluminum stripe and the two diffused regions. The complement input signal generation means is not shown.

SUMMARY AND OBJECTS OF THE INVENTION

It is therefore desirable to implement such a decode circuit using MOS technology while increasing speed by eliminating the requirement for a complement input signal.

In order to furnish the aforementioned advantages, it is an object of the present invention to provide a decode circuit which does not require a complement input signal and which comprises a minimum number of transistors preferably of the MOS (Metal Oxide Semiconductor) field effect type.

It is also an object of this invention to provide a decode circuit which is easily and economically fabricated, which operates at a low power level and which requires a minimal number of connections to external circuitry, yet still retains high-speed characteristics.

These and other objects will become apparent from the following summary and the detailed description of the invention.

Briefly, the main embodiment of the decode circuit of the invention is illustrated for converting a binary code having four input lines to a select signal on any one of 16 output lines. The decode circuit utilizes five basic sub-circuit configurations each of which can be thought of as having at least one transistor in series arrangement connected to at least one transistor in parallel arrangement, wherein the connection between the two arrangements forms one of the output lines. A select signal is generated at the output when each of the transistors in series arrangement are conductive and when each of the transistors in parallel arrangement are nonconductive.

A first subcircuit which produces the first or zero output of the 16 possible outputs, utilizes four transistors in parallel arrangement each of which receives a selected one of the binary input lines. A select signal is generated when all of these four binary inputs are inactive or in a second state. The subcircuit producing the last or number 15 output utilizes four transistors in series arrangement, each of which is connected to receive a selected one of said binary inputs. A select signal will be generated when all of the binary inputs are active or in a first state. A plurality of subcircuits are utilized to produce a select signal upon the receipt of a combination of two or three of the binary input signals in said first state and as such utilize series transistor arrangements and parallel transistor arrangements in selected combination so that a corresponding one out of 16 output or select signals is generated.

BRIEF DESCRIPTION OF THE DRAWING

The advantages of the foregoing configuration of the present invention will become more apparent upon reading the accompanying detailed description in connection with the two sheets of drawings consisting of FIGS. 1 (*a*) and 1 (*p*), which illustrate a schematic diagram showing a decode circuit embodying features of the present invention.

DESCRIPTION OF THE PREFERRED EMBODIMENT

Although it is not contemplated that the present invention be limited to particular types of transistors, illustratively the circuit in the sole figure employs p-channel, MOS (Metal Oxide Semiconductor) field effect transistors or silicon-gate field effect transistors. A full understanding of such transistors may be ascertained by reference to the book entitled "-MOSFET in Circuit Design" and referenced hereinbefore in the description of the prior art. Reference to the article entitled "Silicon-gate Technology" appearing at pages 28 through 35 of the publication IEEE Spectrum, Volume 6, No. 10; Oct. 1969 will be of further aid in such understanding.

Briefly however, the characteristics of such devices are that the impedance between a drain and a source electrode is regulated by the voltage at a gate electrode. The voltage impressed on the gate electrode determines the value of the current flowing in the transistor. For example, if the source and the transistor's substrate are grounded and the drain is at a negative potential, current commences to flow between the drain and the source electrodes when the gate voltage exceeds a negative value, commonly referred to as the threshold voltage and ordinarily designated by the symbol $V_T$. A typical value of $V_T$ is approximately −2 volts. Also contemplated as falling within the scope of the present invention are n-channel type MOS and silicon field effect transistors including the enhancement type and the depletion type transistors.

In the FIGS., a preferred embodiment of the decode circuit of the present invention is illustrated. Here 16 circuits respectively generate one output signal on any one of sixteen outputs $X_0$ to $X_{15}$. The inputs to each of these 16 circuits are coupled to the four binary input lines X(1), X(2), X(4) and X(8), to a voltage reference or first timing signal designated $V_X$ and to a voltage reference or second timing signal designated $V_p$. Thus, the presence or absence of various combinations of the binary input signals are detected or decoded to produce a single output signal on one output representative of the binary condition.

Each of the binary input lines X(1), X(2), X(4), and X(8) in each circuit is received from the same source, for example, the address register contained in the memory system of a digital computer. The lines are physically connected by lines not shown to corresponding input lines X(1), X(2), X(4), and X(8) on each of the 16 subcircuits. In each circuit the drain of the uppermost transistor in the series transistor arrangement is connected to a negative voltage supply designated $-V_S$ whereas the lower connection or sources of the parallel transistor arrangement is connected to the substrate potential, namely ground.

The potentials of references or timing signals $V_X$ and $V_P$ are substantially complementary to each other during the operation of the circuit. More particularly, and by way of example, during the decode cycle when there is a decode operation, reference $V_X$ is at a potential of −20 volts and reference $V_P$ is zero volts or ground. Otherwise when the decode cycle is not in progress, $V_X$ is zero volts and $V_P$ is −20 volts.

The decode circuit illustrated, has sixteen outputs and includes five basic types of subcircuits. A first type of sub-circuit is utilized for generating the $X_P$ output, whereas the fifth basic type of sub-circuit is utilized for generating the $X_{15}$ output. The conditions for producing a select or output signal at the outputs of the first and fifth types of sub-circuits are all binary inputs inactive and all binary inputs active, respectively. In the circuit illustrated, the binary inputs for the purpose of discussion are active when they are at a potential of −20 volts, which is well before the threshold voltage $V_T$ of approximately −2 volts. Thus, for purposes of this discussion the binary inputs will be inactive when they are at ground potential or zero volts.

The circuit producing the $X_O$ output is designated subcircuit 10 (FIG. 1(*a*)) whereas the subcircuit producing the $X_{15}$ output is designated subcircuit 12 (FIG. 1(*p*)), each of which subcircuits is shown respectively within the dotted lines. Subcircuits generating a select or output signal on their outputs in response to combinations of one active and three inactive binary input signals are designed sub-circuits 14, 16, 18 and 20 (FIGS. 1(*b*), 1(*c*), 1(*e*), and 1(*i*) respectively), each of which subcircuits are identical in configuration except for the binary input connections. Subcircuits generating a select signal on their output, in response to two active and two inactive binary input signals are designated subcircuits 22, 24, 26, 28, 30 and 32 (FIGS. 1(*d*), 1(*f*), 1(*g*), 1(*j*), 1(*k*), and 1(*m*) respectively), each of which are identical in configuration except for the binary input connections. Subcircuits generating a select signal on its output in response to three active and one inactive binary input signals are designated subcircuits 34, 36, 38 and 40 (FIGS. 1(*h*), 1(*l*), 1(*n*), and 1(*o*) respectively, each of which is identical in design except for the binary input connections. Each of the above mentioned connections of the binary input signals is illustrated in the figures.

Each of the subcircuits except for the subcircuits 10 and 12 are duplicated throughout the decode circuit of the invention and explanation of the configuration and operation thereof will be limited to such five basic types of subcircuits. Operation of such similar subcircuits is identical except that the selected binary inputs will be different and will be connected to the subcircuits according to that select signal which is to be generated.

In subcircuit 10, a first transistor 42 has its drain connected to negative supply $-V_S$, its gate connected to reference $V_X$ and its source connected to the drain of transistors 44, 46, 48, 50 and 52 which are arranged or connected in parallel. The other end or sources of the parallel arrangement of transistors are connected to ground. Transistor 52 is connected at its gate to receive reference $V_P$, whereas the other parallel transistors have their gates each coupled to a selected binary input. In operation, in the non-decode cycle state or more particularly when reference $V_X$ is not at −20 volts but is at a zero volt potential, transistor 42 is nonconductive or turned off and accordingly there is no current passed therethrough. At this time, voltage $V_P$ is at −20 volts, therefore turning transistor 52 on and establishing a potential of approximately zero volts on the $X_O$ output lines by discharging to ground any voltage on a stray capacitance (not shown) connected between the output line and ground. When the decode cycle does in fact occur, $V_X$ decreases to −20 volts turning transistor 42 on thereby enabling a current path therethrough. Voltage $V_P$ goes to zero volts turning off transistor 52. If any of the binary inputs are active, i.e., at −20 volts, then the respective transistor in the parallel arrangement will be turned on and a zero volt potential will remain on the output line since the stray output capacitance will be discharged. For a select condition to occur therefore at subcircuit 10, each of the binary input lines, namely X(1), X(2), X(4) and X(8) must be inactive, i.e., at a zero volt potential so that their respective transistors remain turned off. The current through transistor 42 will then charge the stray output capacitance and a negative voltage of approximately −15 volts will then be present on the output line thereby indicating a select signal. The −15 volts on the output line is produced by the voltage drop occurring through conductive transistor 42 from the supply voltage $-V_S$.

Those subcircuits, namely subcircuits 14, 16, 18 and 20 which produce outputs $X_1$, $X_2$, $X_4$ and $X_8$ respectively, will now be discussed with reference to representative subcircuit 14. Reference $V_X$ is connected to the gate of transistor 54 whereas its drain is connected to supply $-V_S$. Connected in series with transistor 54 is transistor 56 such that the source of transistor 54 is connected to the drain of transistor 56. The source of transistor 56 is connected to a parallel combination of transistors to be discussed. The gate of transistor 56 is connected to a selected binary input and namely for subcircuit 14 to binary input X(1). The parallel combination of transistors, namely, transistors 58, 60, 62 and 64 have their gates connected to the other three binary inputs and reference $V_P$, respectively and their sources connected to ground. During the non-decode cycle, reference $V_X$ is at zero volts thereby turning transistor 54 off, whereas $V_P$ is at −20 volts turning transistor 64 on and establishing a zero volt potential on the output line X1 by discharging any voltage on the output stray capacitance (not shown). Again, the zero volts on the output line in indicative of a non-select condition. When the decode cycle is initiated, transistor 64 is turned off and transistor 54 now conducts. In order to generate a negative potential approaching $-V_S$ and indicative of a select signal in this subcircuit 14, binary input X(1) must be active whereas the other binary inputs X(2), X(4) and X(8) must be inactive. If this is the case, transistor 56 also conducts whereas transistors 58, 60 and 62 do not conduct. The voltage $-V_S$ is impressed through the impedance drop of transistors 54 and 56 to charge the output stray capacitance and to establish a negative voltage on the $X_1$ output line. If either one of the binary input lines X(2), X(4) and X(8) were active, the respective transistor would have conducted thereby establishing approximately zero volts on the output line regardless of the state of transistors 54 and 56. This is because the current path between $-V_S$ and ground would be essentially a short circuit, and the voltage divider action would not be present.

Subcircuit 16 differs from subcircuit 14 in that the input lines X(1) and X(2) are interchanged. Thus to generate a select signal approaching $-V_S$ at $X_2$, X(2) must be active and X(1), X(4) and X(8) inactive. Similarly in sub-circuit 18 lines X(2), X(1) and X(8) connect to the parallel transistors and line X(4) to the series transistor. To generate a select signal at $X_4$, line X(4) is active and lines X(2), X(1) and X(8), inactive. In sub-circuit 20 lines X(2), X(4) and X(1) connect to the parallel transistors, while line X(8) connects to the series transistor. A select signal occurs at $X_S$ when line X(8) is active and lines X(2), X(4) and X(1) inactive.

The third basic subcircuit includes subcircuits 22, 24, 26, 28, 30 and 32, each of which is substantially identical except for the input connections and each of which will be discussed with reference to representative sub-circuit 22. Transistors 66, 68 and 70 are connected in series between voltage supply $-V_S$ and the drains of parallel transistors 72, 74 and 78. The gates of transistors 66, 68 and 70 are connected to reference $V_X$ and binary inputs X(1) and X(2), respectively. The gates of the parallel transistors are connected to the other two binary inputs and reference $V_P$. The $X_3$ output line is connected at the junction of the series transistors and the parallel transistor arrangement. During the non-decode cycle and independent of the condition of the binary input signals, no current flows in the series transistor arrangement. Also, transistor 78 is conducting and therefore the output voltage is discharged to zero volts. Upon occurrence of the decode cycle transistor 78 is turned off and transistor 66 is allowed to conduct because voltage $V_X$ is now at −20 volts. A current path will not be fully generated, however, unless the binary inputs X(1) and X(2) are active. The current path will be through transistors 66, 68 and 70 through a stray capacitance (not shown) coupled between the $X_3$ output and ground, the stray capacitance as stated before for the other subcircuits not being part of the circuit but being utilized therein. Accordingly, this capacitor will be charged to a potential approaching $-V_S$ if the other two binary inputs are at zero volts and if, of course, reference $V_P$ is also at zero volts as is the stated case. Thus a select signal will appear at the $X_3$ output line. If either or both of the binary input signals X(4) or X(8) are active, then the current path will be through either or both of the respective transistors, thereby discharging any voltage stored in the stray output capacitance so that the potential on the $X_3$ output line will remain at zero volts thereby indicating a non-select condition.

Changing the combination of connections of the input lines in the other sub-circuits of this type changes the needed conditions for select signals.

Now referring to the fourth basic sub-circuit or namely subcircuits 34, 36, 38 and 40, they will be discussed by way of example by reference to representative subcircuit 34. Subcircuit 34 includes four transistors 80, 82, 84 and 86 connected in series between the voltage supply $-V_S$ and the parallel combination of transistors 88 and 90. The gate of transistor 80 is connected to reference $V_X$, whereas transistors 82, 84 and 86 have binary inputs X(1), X(2) and X(4) respectively connected to their gates. Reference $V_P$ is connected to the gate of transistor 90 whereas the other binary input signal X(8) is connected to the gate of transistor 88. The junction between the series combination of transistors and the parallel combination of transistors forms the $X_7$ output line. Normally, the $X_7$ output line is at zero volts. That is, during the non-decode cycle reference $V_X$ now at zero volts causes transistor 80 to be nonconductive and reference $V_P$ allows transistor 90 to conduct thereby discharging any voltage from the stray output capacitance (not shown) and establishing a zero voltage or non-select condition on the $X_7$ output line. During the decode cycle, the state of reference $V_X$ and $V_P$ interchange and therefore transistor 80 now becomes capable of conducting and transistor 90 now becomes nonconductive. A negative voltage approaching the voltage $-V_S$ on the $X_7$ output line is generated provided that the binary inputs X(1), X(2) and X(4) become active and binary input X(8) becomes inactive. As in the previous examples, should one of the parallel connected transistors be turned on, or namely should the binary input signal X(8) be active, transistor 88 will turn on and the current path will now be through the series combination of transistors, through transistor 80 to ground, thereby discharging any voltage stored in the stray output capacitance so that a zero voltage will appear or remain on the $X_7$ output line. Of course, should either one of the binary outputs X(1), X(2) or X(4) be at zero volts, then this will break any current path through the series combination of transistors so that the stray capacitance cannot be charged toward voltage $-V_S$ and therefore the $X_7$ output line will remain at zero volts. As can be seen in the above examples and that following, the reference $V_P$ in association with its respective transistor insures that during the non-decode cycle, the stray output capacitance will be discharged therethrough thereby producing a zero volt level on the output line.

Having discussed the first four basic subcircuits of the decode circuit of the invention, the fifth and final basic subcircuit will now be discussed. This subcircuit 12 is utilized once in the circuit and produces an output when each of its binary input signals are active. Of course, reference $V_X$ and $V_P$ must be at the proper potentials as discussed hereinbefore. The binary inputs X(1), X(2), X(4) and X(8) are connected to the gates of transistors 92, 94, 96 and 98, respectively. These four transistors are connected in series with transistor 100 whose gate is connected to reference $V_X$. The drain of transistor 100 is connected to supply voltage $-V_S$. The other end of this series arrangement has the source of transistor 98 connected to the drain of transistor 102 which transistor has its gate connected to reference $V_P$. It should be noted that the transistor, in this case transistor 102, had been previously connected in parallel arrangement with at least one of the other transistors having as inputs a selected binary signal. Accordingly reference to transistors in parallel arrangement shall include the possibility of one transistor only. In operation, initially during the non-decode cycle the voltage $V_P$ is $-20$ volts and accordingly transistor 102 is conducting. Regardless of the condition of transistors 92, 94, 96 and 98, a zero volt potential will be established on the $X_{15}$ output line. When reference $V_P$ goes to zero volts and $V_X$ goes to $-20$ volts during the decode cycle, transistor 102 will be turned off and transistor 100 will be capable of conducting. For a select condition to occur all of the binary inputs must be active, thereby turning on their respective transistors and allowing transistor 100 to conduct to establish a voltage on the $X_{15}$ output line approaching voltage $-V_S$. Had either of the binary inputs remained inactive, a zero volt potential would have remained on the $X_{15}$ output line.

The five basic sub-circuits of the invention now having been discussed, the operation of each of the other subcircuits should be apparent. Briefly, for example, subcircuit 18 develops a select signal on the $X_4$ output line when the X(4) binary input is active and X(1), X(2) and X(8) binary inputs are inactive or at zero volts. Subcircuit 36 produces a select signal condition on the $X_{11}$ output line when the binary inputs X(1), X(2) and X(8) are active and the binary input $X_4$ is inactive. Thus the combination of those three binary inputs representing the decimal 11 produces the one out of sixteen outputs on the $X_{11}$ output line. Another of the representative subcircuits whose operation should be apparent is that of subcircuit 28 wherein a select signal is established on the $X_9$ output line when the binary inputs X(1) and X(8) are active while the binary inputs on X(2) and X(4) are inactive.

It should be understood that the underlying decode arrangement of the invention having been utilized to convert a binary input signal to one of sixteen output signals may have been arranged to convert any first code to a second code. For example, the circuits of the invention are not limited to that number of transistors shown in series. Additional transistors and therefore additional inputs may have been further arranged in such serial fashion. The same comment is true for the parallel transistor arrangement wherein additional transistors may have been utilized. The binary inputs may have been arranged so that different code conversion may have been ascertained. Likewise, fewer transistors may have been utilized for decoding of fewer input signals.

It should be further understood that the decode circuit may be utilized with a resistive output load so that current would flow in the selected subcircuit during the entire decode cycle. As presented, such subcircuit when selected would conduct only until the stray output capacitance was fully charged.

It is a further feature of the invention that low power consumption is required for the operation thereof. For example, during the non-decode cycle, i.e., when reference $V_X$ is at zero volts and reference $V_P$ is at $-20$ volts no current is drawn from the supply $-V_S$ thus no power at all is required. During the decode cycle and depending on the binary input condition, there is no current path in many of the subcircuits. For example, in subcircuit 38, only if all of the binary inputs X(1), X(4) and X(8) are active and X(2) inactive will an output be generated on the $X_{13}$ output line. In the condition when a select signal is not generated on the $X_{13}$ output line, no current flows in the circuit except when all binary inputs are active. For example, again referring to subcircuit 38, this power saving feature may be so illustrated by assuming binary inputs X(2) and X(1) to be inactive whereas binary inputs X(4) and X(8) to be active. Binary inputs X(1) being inactive, turns off its corresponding transistor thereby opening the series circuit so that current does not flow in the subcircuit 38. This power saving feature is ascertained in each of the basic subcircuits as has been discussed for subcircuit 38.

It should also be understood that the transistor connected in parallel arrangement and responsive to reference $V_P$ is not required in the decode circuit except to insure that the output line will be at ground potential during the non-decode cycle. The only exception to this, that is, the only subcircuit in which such transistor is required is in subcircuit 12. Otherwise, should a select signal appear on the $X_{15}$ output line, there would be no way to discharge the select signal to zero volts during the non-decode cycle. However, an additional embodiment might be utilized to eliminate the requirement for such reference $V_P$ responsive transistor. Such embodiment may be utilized with each of the subcircuits and would require somewhat different timing. Explanation of this embodiment will be made with reference to subcircuit 12 wherein transistors 100 and 102 would be eliminated. Reference $V_X$ would connect to the drain of transistor 92 and each of the binary inputs would be reset to −20 volts during the non-decode cycle. With this arrangement, during the non-decode cycle when the binary inputs at −20 volts, transistors 92, 94, 96 and 98 will conduct and since reference $V_X$ is zero volts, the $X_{15}$ output line will be brought to zero volts. However, it should be understood that there must exist at least one series transistor in each of the sub-circuits, and therefore in subcircuit 10, the transistor 42 would remain and transistor 52 removed, however the connections of reference $V_X$ and supply voltage $-V_S$ would be interchanged.

It should be further understood that the decode circuit applying the principles of the figures may be modified in a variety of other ways. The preceding description has been of preferred embodiments of the present invention. Various changes and modifications will be apparent to those skilled in the art, therefore this invention is to be interpreted not by the specific disclosure herein but only in view of the appended claims.

Having now described the invention, what is claimed as new and for which it is desired to secure by Letters Patent is:

I claim:

1. A decode circuit comprising:

A. a plurality of subcircuits;

B. a plurality of input lines for receiving input signals, each line connected to all of said subcircuits;

C. a plurality of output lines each connected to a different one of said subcircuits;

D. each of said subcircuits including first and second portions;

E. each of said subcircuits including a plurality of transistors;

F. said first portion in each subcircuit including a first transistor of said plurality of transistors and said second portion in each subcircuit including a second transistor of said plurality of transistors series connected with said first transistor;

G. each of said output lines being connected between said first and second series connected transistors;

H. further transistors of said plurality of transistors in each of said subcircuits being connected in at least one of said portions;

I. some of said further transistors connected in said first portion in series arrangement with said first transistor and others of said further transistors connected in said second portion in parallel arrangement with said second transistor;

J. said further transistors being distributed among said portions in separate combinations and having control electrodes connected to said input lines for forming separate combinations to decode the information on said input lines, the control electrode of each transistor of said plurality of transistors in each subcircuit connected to a different one of said input lines; and K. whereby an output signal is generated when each of said transistors in series arrangement are in a first state and each of said transistors in parallel arrangement are in a second state.

2. A decode circuit as defined in claim 1 wherein said input signal includes a plurality of bits and wherein:

A. the number of input lines to each of said subcircuits corresponds to the number of bits in said input signal; and wherein B. The total number of transistors in said series and parallel arrangements is no less than the number of input lines to each of said subcircuits.

3. A decode circuit as defined in claim 1 wherein:

A. a first subcircuit of said plurality of subcircuits includes one transistor in said first portion and a plurality of transistors in said parallel arrangement;

B. a last subcircuit of said plurality of subcircuits includes a plurality of transistors in said series arrangement and one transistor in said second portion; and C. the remaining subcircuits of said plurality of subcircuits includes a plurality of transistors in said series arrangement and a plurality of transistors in said parallel arrangement.

4. A decode circuit as defined in claim 3 wherein said first state is that in which said transistors in series arrangement are conductive and said second state is that in which said transistors in parallel arrangement are nonconductive.

5. A decode circuit as defined in claim 4 further including:

A. a first timing signal which when activated determines the time of said decoding; and wherein B. said first portion further includes a timing transistor conductive upon the activation of said first timing signal thereby allowing the generation of a select signal.

6. A decode circuit as defined in claim 5 further including:

A. a second timing signal which is active when said first timing signal is inactive; and wherein B. said second portion includes a clamping transistor conductive upon the activation of said second timing signal so that a select signal cannot appear on a corresponding output line.

7. A decode circuit as defined in claim 3 wherein said plurality of transistors are of the field effect type and of the same carrier type.

8. A circuit for decoding an input signal which includes a plurality of information bits, to a corresponding output signal appearing on a single one of a plurality of output lines, said circuit comprising:

A. a first potential source;

B. a second potential source;

C. a plurality of subcircuits some of which include 1. a plurality of series connected transistors, responsive to selected ones of said bits,
2. a plurality of parallel connected transistors responsive to other selected ones of said bits, and wherein
3. said first potential source is connected to one end of said plurality of series connected transistors, said second potential source is connected to one end of said plurality of parallel connected transistors, and wherein the other ends of said plurality of series and parallel connected transistors are connected together to form an output line; and wherein D. a corresponding output signal is generated when each of said plurality of series connected transistors are conductive and each of said plurality of parallel connected transistors are nonconductive.

9. A circuit as defined in claim 8 further including an additional subcircuit, said additional subcircuit including:

A. a reference signal;

B. a plurality of series connected transistors, responsive to selected ones of said bits, which is responsive to and connected at one end to receive said reference signal and which is connected at the other end to an output lines; and wherein C. each of said series connected transistors conducts in response to the receipt of said reference signal and said bits thereby generating an output signal on said output line.

10. A circuit for decoding an input signal which includes a plurality of information bits, to an output signal appearing on a single one of a plurality of output lines, said circuit comprising:

A. a first timing signal, the occurrence of which determines the time of said decoding;

B. a second timing signal which occurs during the absence of said first timing signal;

C. a first subcircuit comprising 1. a first series transistor coupled for response to said first timing signal, and
2. a first plurality of parallel connected transistors each responsive to selected ones of said bits, said parallel transistors connected in series with said first series transistor;

D. a plurality of second subcircuits each of which comprises 1. a second series transistor coupled for response to said first timing signal,
2. at least one transistor connected in series with said second transistor and responsive to a selected one of said bits, and
3. a second plurality of parallel connected transistors, each responsive to selected ones of said bits, said parallel transistors connected in series with said series connected transistors;

E. a third subcircuit comprising
1. a third series transistor coupled for response to said first timing signal,
2. a third plurality of series connected transistors connected in series with said third series transistor and each responsive to selected ones of said bits,
3. a fourth parallel connected transistor responsive to said second timing signal, said fourth parallel transistor connected in series with said third plurality of series connected transistors; and wherein F. each of said subcircuits forms an output line at the connection between its at least one series connected transistor and its at least one parallel connected transistor such that an output signal is generated when each of said at least one series transistor is conductive and when each of said at least one parallel transistor is nonconductive.

11. A circuit as defined in claim 10 wherein one of said transistors in said parallel connected transistors in each of said subcircuits is responsive to said second timing signal.

* * * * *